United States Patent [19]
Havinis

[11] Patent Number: 6,104,932
[45] Date of Patent: Aug. 15, 2000

[54] SYSTEM AND METHOD FOR HANDLING LOCATION SERVICES BY IMPLEMENTING A NEW TRANSACTION TYPE AT THE CONNECTION-MANAGEMENT LEVEL

[75] Inventor: Theodore Havinis, Plano, Tex.

[73] Assignee: Ericsson Inc., Research Triangle Park, N.C.

[21] Appl. No.: 09/151,039

[22] Filed: Sep. 10, 1998

[51] Int. Cl.[7] ........................................... H04Q 7/20
[52] U.S. Cl. .................. 455/456; 455/560; 455/414; 455/466; 455/517
[58] Field of Search ...................... 455/456, 560, 455/414, 466, 517, 432, 435, 436, 406

[56] References Cited

U.S. PATENT DOCUMENTS

| | | | |
|---|---|---|---|
| 5,907,805 | 5/1999 | Chotai | 455/432 |
| 5,956,646 | 9/1999 | Kolev et al. | 455/517 |
| 5,999,825 | 12/1999 | Geulen | 455/560 |

*Primary Examiner*—Edward F. Urban
*Assistant Examiner*—Rafael Perez-Gutierrez
*Attorney, Agent, or Firm*—Jenkens & Gilchrist, P.C.

[57] ABSTRACT

A telecommunications system and method is disclosed for allowing Location Services (LCS) transactions to be performed in parallel to other existing transactions by defining within the Connection Management (CM) sublayer level of the application level of the system, a new type of layer, called the LCS layer. The LCS layer will be in parallel with the call control, short message and supplementary services layers of the CM layer. Therefore, an LCS transaction can be performed in parallel to any other existing transaction for the same mobile subscriber at any given time. In addition, the new LCS layer defined on the CM sublayer can be used as a generic layer in the CM sublayer to cater to any network and/or mobile terminal features not belonging to any existing layer in the CM sublayer.

14 Claims, 5 Drawing Sheets

SYSTEM AND METHOD FOR HANDLING LOCATION SERVICES BY IMPLEMENTING A NEW TRANSACTION TYPE AT THE CONNECTION-MANAGEMENT LEVEL

BACKGROUND OF THE PRESENT INVENTION

1. Field of the Invention

The present invention relates generally to telecommunications systems and methods for positioning a mobile terminal within a cellular network, and specifically to offering location services in parallel to other existing services.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 18 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC 14, integrated with the MSC 14, or alternatively can service multiple MSCs 14, the latter of which is illustrated in FIG. 1.

Determining the geographical position of an MS 20 within a cellular network 10 has recently become important for a wide range of applications. For example, location services (LCS) may be used by transport and taxi companies to determine the location of their vehicles. In addition, for emergency calls, e.g., 911 calls, the exact location of the mobile terminal 20 may be extremely important to the outcome of the emergency situation. Furthermore, LCS can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

Currently, when an MS 20 is being positioned, the MS 20 is not always able to make or receive calls, send or receive short messages, or activate other supplementary services. With reference now to FIG. 2 of the drawings, using the Open Systems Interconnection (OSI) model, which was developed by the International Standards Organization (ISO) in 1982, the inability of the MS 200 to engage in other activities while being positioned can be explained by describing the GSM system as several functional layers arranged in hierarchical form. These consist of the physical layer 205, the data link layer 210 and the application layer 215, which are on both the network side (MSC 240) and the terminal side (MS 200). The application layer 215 is composed of three sublayers: Radio Resource (RR) 220, Mobility Management (MM) 230 and Connection Management (CM) 235.

The CM protocol 235, which is the highest layer, controls three separate transaction types: end-to-end call control (CC layer) 232, short message handling delivery (SM layer) 234 and call independent handling of supplementary services (SS layer) 236. As it is today, it is possible for a mobile subscriber to establish several CM-connections 230, using the same MM and RR-connection 220. Therefore, it is possible to provide several telecommunication services at one time and to change between different services if necessary.

Any transaction may be established in parallel to any combination of other transactions. However, for a given RR-connection 220, MM-connections 230 can only be established once for each of the transaction types 232, 234 and 236. Thus, only one MM-connection 230 is allowed at a time per transaction type 232, 234 and 236. That implies that, if LCS were to be defined as part of either the CC layer 232, SM layer 234 or SS layer 236, it would be impossible to offer an LCS transaction at the same time as another transaction if both transactions belonged to the same transaction type (CC 232, SS 234 or SM 236).

It is, therefore, an object of the present invention to allow LCS transactions to be performed in parallel to other existing transactions such as mobile originating call or mobile terminating call, supplementary services and mobile originating or mobile terminating short messages.

SUMMARY OF THE INVENTION

The present invention is directed to telecommunications systems and methods for allowing LCS transactions to be performed in parallel to other existing transactions by defining within the Cm management sublayer level, a new type of layer, called the LCS layer. The LCS layer will be in parallel with the CC, SS and SM layers of the CM sublayer. Therefore, an LCS transaction can be performed in parallel to any other existing transaction for the same mobile subscriber at any given time. In addition, the new LCS layer defined on the CM sublayer level can be used as a generic layer in the CM sublayer to cater for any network and/or MS features not belonging to any existing layer in the CM sublayer.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
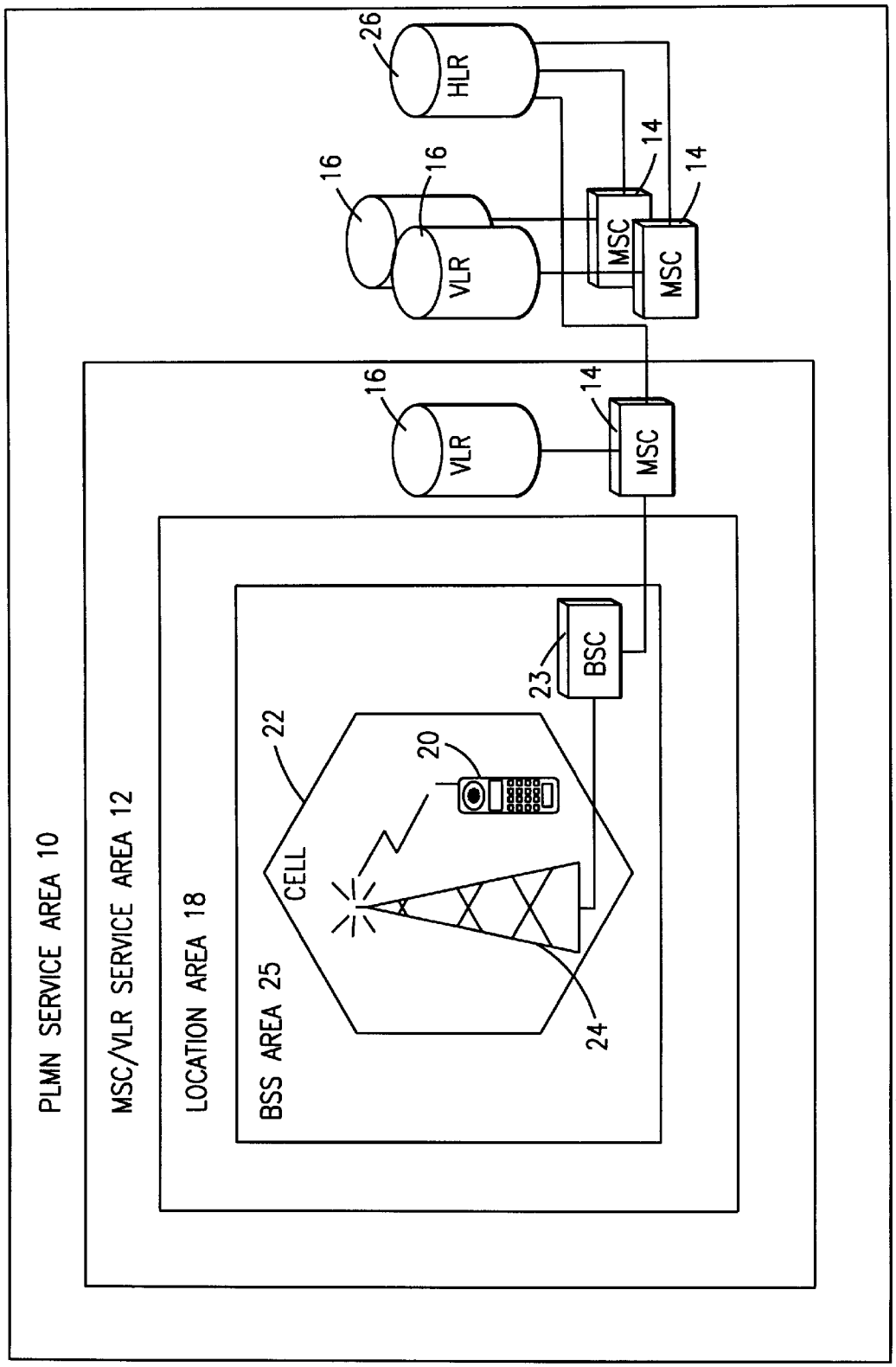
FIG. 1 is a block diagram of a conventional wireless telecommunications system.
Figure 2:
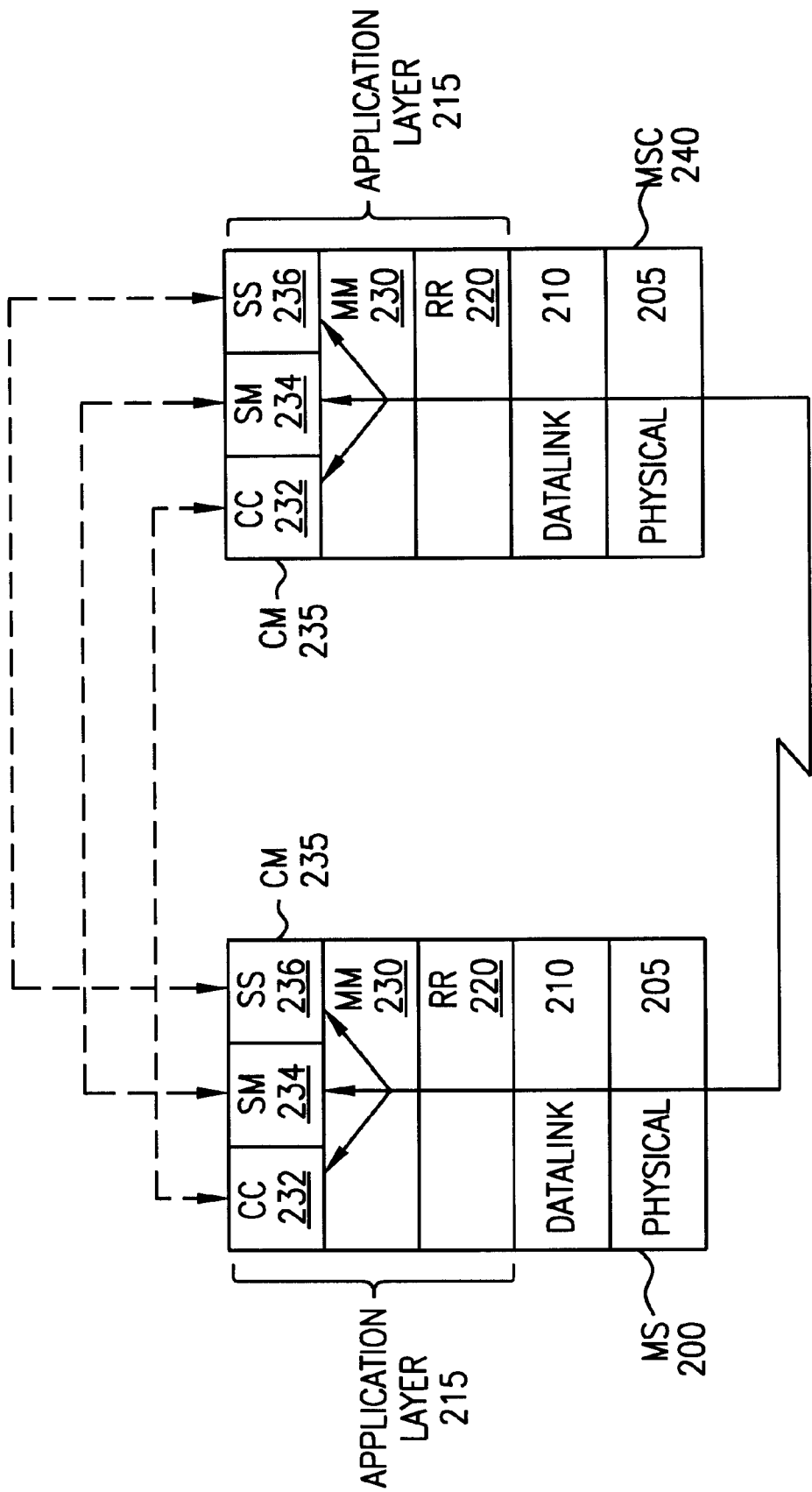
FIG. 2 describes the GSM cellular system as several functional layers arranged in hierarchical form in accordance with OSI standards.
Figure 3:
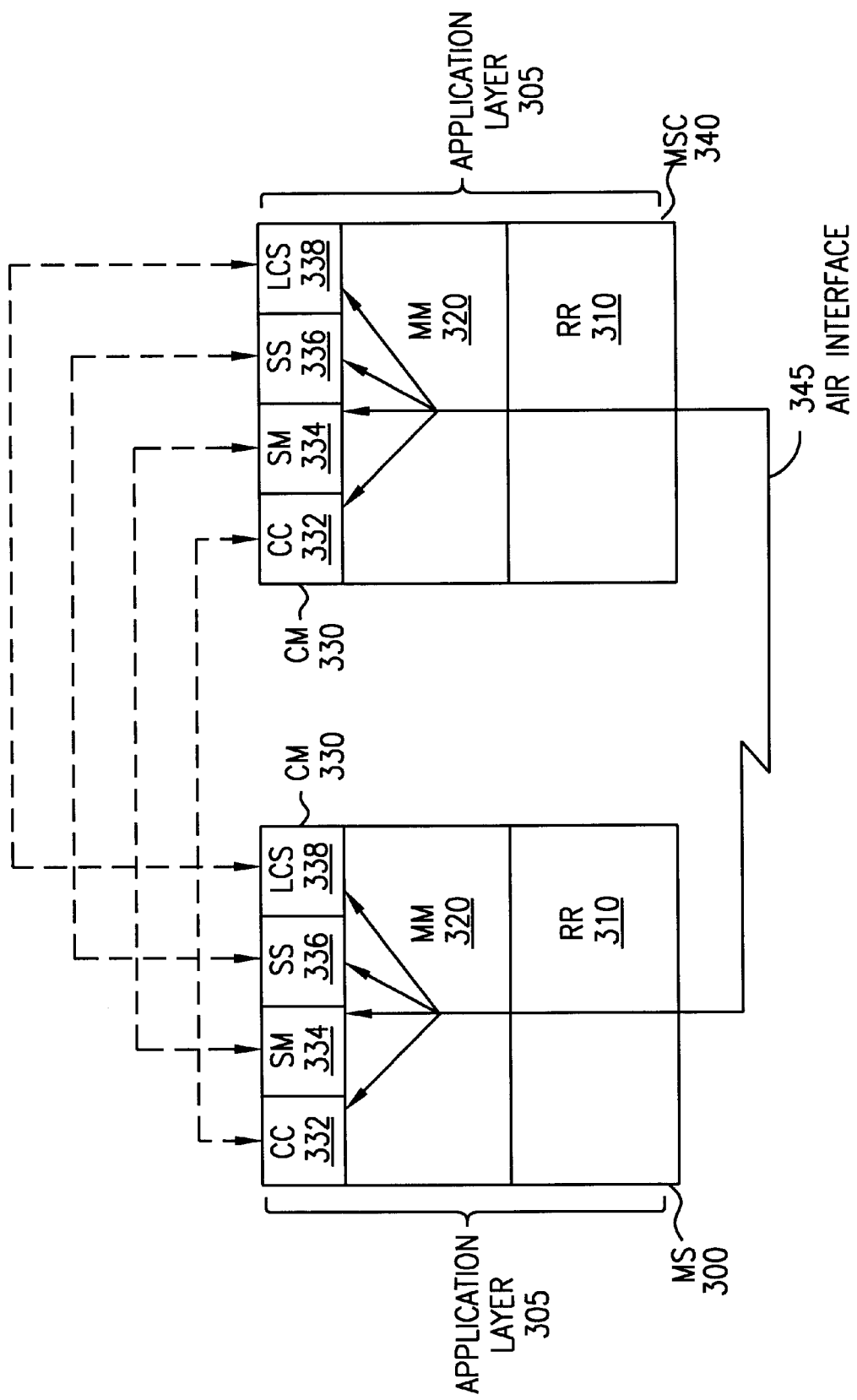
FIG. 3 illustrates the implementation of a new LCS transaction type in the CM-sublayer in accordance with preferred embodiments of the present invention.

With reference now to FIG. 3 of the drawings, in order to overcome the architectural restraint on initiating both Location Services (LCS) and either a call connection, a short message, or other type of supplementary service in parallel, a new type of layer called LCS 338 can be defined on the connection management (CM) sublayer level 330 of the application layer 305. The LCS layer 338 or transaction type will be in parallel with the call control (CC) 332, short message (SM) 334 and supplementary service (SS) 336 layers. Therefore, an LCS transaction 338 can be performed in parallel to any other existing transaction for the same mobile subscriber at any one time by means of existing Direct Transfer Application Part (DTAP) signaling.

As between a Mobile Station (MS) 300 and a Mobile Switching Center (MSC) 340, the MS 300 can establish several Mobility Management (MM)-connections 320 with the MSC 340, using the same Radio Resource (RR)-connection 310, which is the layer responsible for converting the digital data into bit streams for transmission across the air interface 345. Therefore, it is possible to provide several telecommunication services at one time and to change between different services if necessary. Any transaction may be established in parallel to any combination of other transactions. However, for a given RR-connection 310, only one MM-connections 320 can be established for each of the transaction types 332, 334, 336 and 338. Thus, only one MM-connection 320 is allowed at a time per subscriber per transaction type 332, 334, 336 and 338.

The MS 300 can establish such an MM-connection 320 by the MS 300 transaction type layer, e.g., LCS 338, sending the request through its MM 320 and RR 310 layers to establish an MM-connection 320 with the LCS layer 338 on the MSC 340. The request is sent over the RR-connection 310 between the MS 300 and the MSC 340 using DTAP signaling. If, on the other hand, a transaction type layer 332, 334, 336 or 338 on the MSC 340 would like to establish an MM-connection 320 with the associated transaction type layer 332, 334, 336 or 338, respectively, of the MS 300, the process is reversed.

Figure 4:
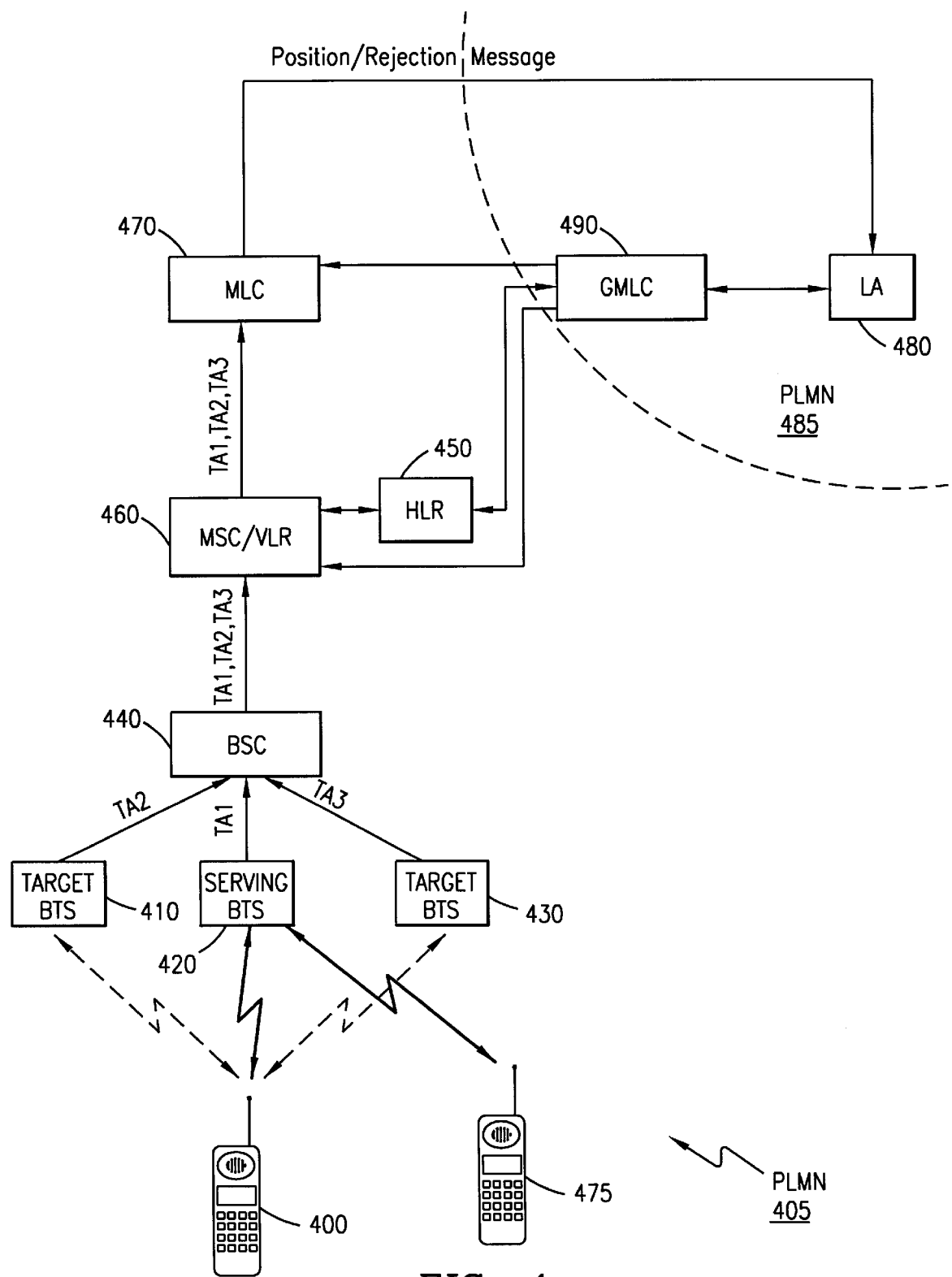
FIG. 4 shows the simultaneous positioning of a mobile terminal and establishment of a call connection with that mobile terminal using embodiments of the present invention.
Figure 5:
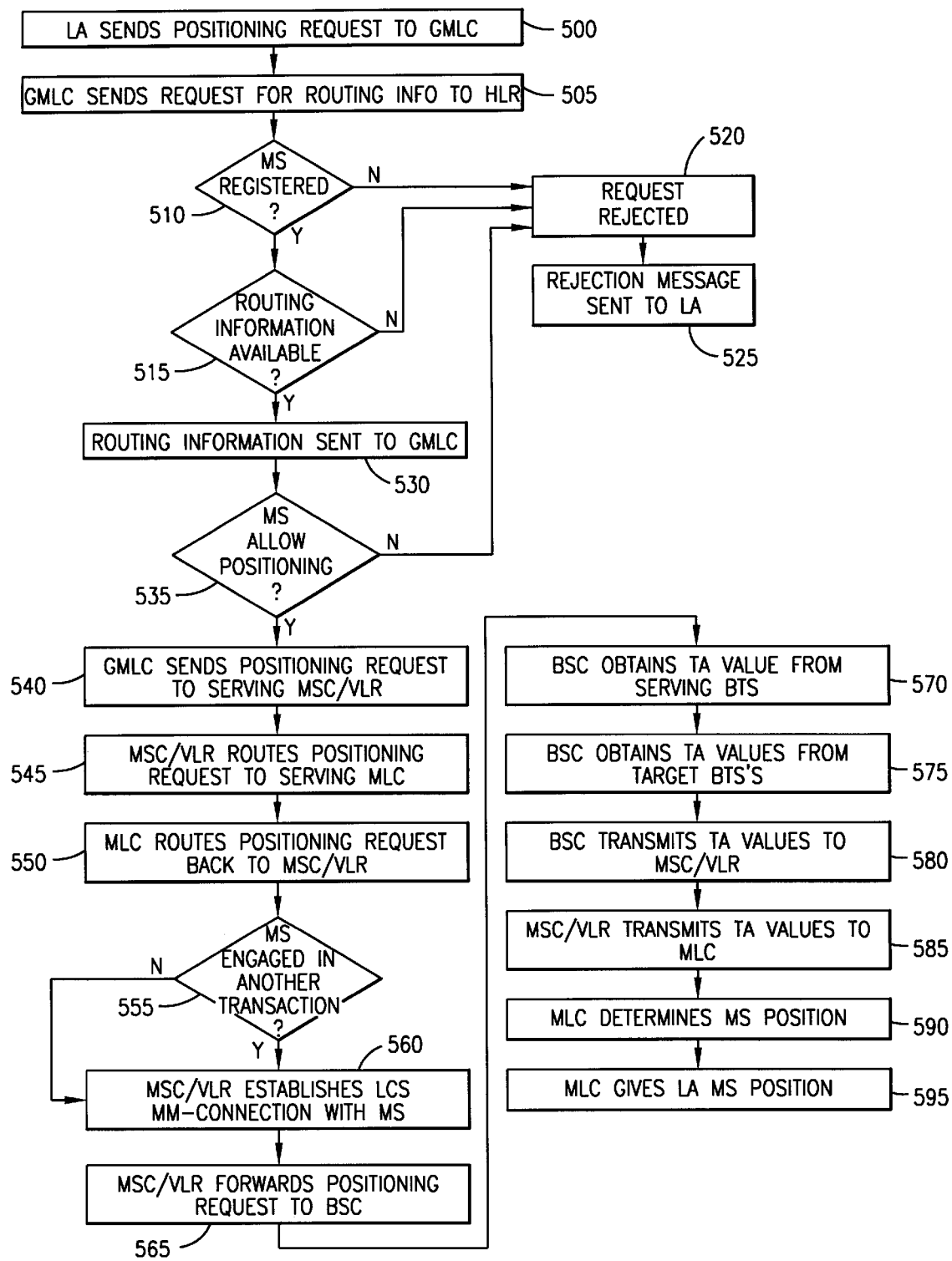
FIG. 5 shows steps in implementing the process illustrated in FIG. 4.

With the new LCS layer 338, when a positioning request for a particular MS 300 is received by the serving MSC 340, positioning of that MS 300 can be performed regardless of whether the MS 300 is currently engaged in a call, receiving or sending a short message or utilizing any other supplementary services For example, as can be seen in FIG. 4 of the drawings, which will be described in connection with the steps listed in FIG. 5 of the drawings, positioning of a particular MS 400 typically begins by a requesting Location Application (LA) 480 sending a positioning request, which specifies the particular Mobile Station International Subscriber Identity Number(s) (MSISDN) associated with the particular MS 400 to be positioned, to a Gateway Mobile Location Center (GMLC) 490 within the Public Land Mobile Network (PLMN) 485 of the LA 480 (step 500).

When the GMLC 490 receives the positioning request (step 500), the GMLC 490 sends a request for routing information (step 505), e.g., the address of the MSC/VLR 460 serving the PLMN 405 that the MS 400 is currently located in and positioning subscription information for the MS 400, to the MS's 400 Home Location Register (HLR) 450, using the MS's 400 directory number as a global title. The signaling network, e.g., the Signaling System #7 (SS7) network (not shown), can perform a global title translation on the MSISDN and route the request to the appropriate HLR 450 for the MS 400.

The HLR 450 then checks its records to confirm that the MS 400 is registered in the HLR 450 (step 510), and that routing information for that MS 400 is available (step 515). If the MS 400 is not registered in the HLR 450 (step 510) or the routing information is not available (step 515), the routing information request is rejected by the HLR 450 (step 520) and the GMLC 490 sends a rejection message to the LA 480 (step 525). However, if the MS 400 is registered in the HLR 450 (step 510) and routing information is available (step 515), the routing information, e.g., the serving MSC/VLR 460 address, together with the positioning subscription information, is sent to the GMLC 490 (step 530).

The GMLC 490 then verifies that the MS 400 allows positioning to be performed (step 535), e.g., by checking the positioning subscription information, sent by the HLR 450. Alternatively, the serving MSC/VLR 460 or serving Mobile Location Center (MLC) 470 can check the positioning subscription information of the MS 400. If the MS 400 does not allow positioning (step 535), the positioning request is rejected (step 520) and a rejection message is sent to the LA 480 (step 525). However, if the MS 400 does allow positioning (step 535), the GMLC 490 can then send the positioning request to the serving MSC/VLR 460 (step 540), using the MSC/VLR 460 address. The MSC/VLR 460 can then route the positioning request to the MLC 470 serving the PLMN 405 that the MS 400 is located in (step 545). Alternatively, the GMLC 490 can derive, from the MSC/VLR 460 address, the address of the MLC 470 in the serving PLMN 405, using, for example, a look-up table (database). Thereafter, the positioning request can be routed directly to the MLC 470 in the serving PLMN 405 (step 545). It should be understood that the MLC 470 can be co-located with the serving MSC/VLR 460 or can be a separate node, the latter being illustrated.

Once the MLC 470 receives the positioning request, the MLC 470 can then send the positioning request to the serving MSC/VLR 460 (step 550), instructing the MSC/VLR 460 to perform positioning of the MS 400. Normally, at this point, if the MSC/VLR 460 determines that the MS 400 has established a call connection or is receiving or sending a short message or utilizing other supplementary services, the positioning request would be rejected. However, with the new LCS layer 338 shown in FIG. 3, if, for example, the MS 400 is engaged in a call connection with another subscriber (step 555), e.g., another MS 475, the MSC/VLR 460 can allow the positioning to occur by establishing an LCS 338 MM-connection 320 between the MSC/VLR 460 and the MS 400 to be positioned in addition to the CC 332 MM-connection 320 between the MSC/VLR 460 and the MS 400 (step 560).

In order to complete the positioning process, the serving MSC/VLR 460 can then forward the positioning request to a Base Station Controller (BSC) 440 (step 565). It should be noted that if the MS 400 is not engaged in a call connection, e.g., the MS 400 is in idle mode, the serving MSC/VLR 460 must first page the MS 400 and setup a call to the MS 400 prior to forwarding the positioning request to the BSC 440 (step 565). This call does not activate the ringing tone on the MS 400, and therefore, is not noticed by the MS 400.

The originating BSC 440 then determines which Base Transceiver Station (BTS) 420 is currently serving the MS 400, and obtains a Timing Advance (TA) value (TA1), or other positioning data, from this serving BTS 420 (step 570), if possible. TA values corresponds to the amount of time in advance that the MS 400 must send a message in order for the BTS 420 to receive it in the time slot allocated to that MS 400. When a message is sent from the MS 400 to the BTS 420, there is a propagation delay, which depends upon the distance between the MS 400 and the BTS 420. TA values are expressed in bit periods, and can range from 0 to 63, with each bit period corresponding to approximately 550 meters between the MS 400 and the BTS 420.

Thereafter, TA values are obtained from at least two target BTSs (410 and 430) (step 575) by performing a positioning handover. If the serving BTS 420 does not support positioning, an additional target BTS (not shown) must be selected. It should be noted that positioning of the MS 400 can be performed using more than three BTSs (410, 420, and 430).

The TA values (TA2 and TA3) measured by the target BTS's (410 and 430) are then transmitted by the serving BSC 440 to the MSC/VLR 460, together with the TA value TA1 obtained from the serving BTS 420 (step 580). Finally, the TA values (TA1, TA2 and TA3) are forwarded to the serving MLC 470 from the MSC/VLR 460 (step 585), where the location of the MS 400 is determined using a triangulation algorithm (step 590). The MLC 470 then presents the geographical position of the MS 400 to the requesting LA (node) 480 (step 595) without interrupting the call connection between the positioned MS 400 and the additional MS 475.

It should be understood, however, that any estimate of time, distance, or angle for any cellular system can be used, instead of the TA value method discussed herein. For example, the MS 400 can have a Global Positioning System (GPS) receiver built into it, which can be used to determine the location of the MS. In addition, the MS 400 can collect positioning data based on the Observed Time Difference (OTD) between the time a BTS 420 sends out a signal and the time the MS 400 receives the signal. This time difference information can be sent to the MLC 470 for calculation of the location of the MS 400. Alternatively, the MS 400, with knowledge of the location of the BTS 420, can determine its location and forward it to the MLC 470.

In addition to providing a layer for Location Service features, the new LCS layer 338 in FIG. 3, which is defined on the CM-sublayer level 330 can be used as a generic layer in the CM-sublayer 330 to cater for any network 340 and/or Mobile Station (MS) 300 features not belonging to any existing layer 332, 334 or 336 in the CM-sublayer 330. However, in this case, if the LCS layer 338 is used for another feature for a particular subscriber, positioning of that subscriber at the same time would not be possible.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for allowing location services to be offered in parallel to existing services, said telecommunications system comprising:

a mobile switching center in wireless communication with a plurality of mobile terminals, said mobile switching center receiving a location service request for a given one of said plurality of mobile terminals;

a connection management sublayer within said mobile switching center and said given mobile terminal, said connection management sublayer supporting a location service transaction type and at least one additional transaction type therein; and a mobility management sublayer within said mobile switching center and said given mobile terminal, said mobile switching center establishing a connection between said location service transaction type of said mobile switching center and said location service transaction type of said given mobile terminal, using said mobility management sublayer, to perform said location service request.

2. The telecommunications system of claim 1, further comprising a radio resource sublayer within said mobile switching center and said given mobile terminal, said mobility management connection between said location service transaction types of said mobile switching center and said given mobile terminal being established using said radio resource sublayer.

3. The telecommunications system of claim 2, further comprising a physical layer, a data link layer and an application layer within said mobile switching center and said given mobile terminal, said radio resource sublayer, said connection management sublayer and said mobility management sublayer residing in said application layer.

4. The telecommunications system of claim 1, wherein said at least one additional transaction type includes at least one of: a call control transaction type, a short message transaction type and a supplementary services transaction type.

5. The telecommunications system of claim 1, wherein said given mobile terminal and said mobile switching center also have an additional mobility management connection between said respective at least one additional transaction types, wherein services represented by said location service transaction type and said at least one additional transaction type are offered in parallel without disrupting each other.

6. The telecommunications system of claim 1, wherein said at least one additional transaction type is a call control transaction type, said given mobile terminal and said mobile switching center having an additional mobility management connection between said respective call control transaction types in order to establish a call connection with said given mobile terminal, said mobility management connection between said respective location service transaction types of said mobile switching center and said given mobile terminal being established without disrupting said call connection.

7. The telecommunications system of claim 1, wherein said at least one additional transaction type includes a call control transaction type, a short message transaction type and a supplementary service transaction type, said location service transaction type supporting location services and additional services not supported by said call control transaction type, said short message transaction type or said supplementary service transaction type.

8. A telecommunications system for providing location services in parallel to call control services, short message services and supplementary services, said telecommunications system comprising:

a radio resource sublayer within a mobile switching center and a plurality of mobile terminals, said mobile switching center being in wireless communication with said plurality of mobile terminals, said radio resource sublayer transmitting data between said mobile switching center and each of said plurality of mobile terminals;

a connection management sublayer within said mobile switching center and said plurality of mobile terminals, said connection management sublayer having a call control transaction type, a short message transaction type, a supplementary service transaction type and a location service transaction type therein; and a mobility management sublayer within said mobile switching center and said plurality of mobile terminals, said mobility management sublayer providing connections between said call control transaction types, said short message transaction types, said supplementary service transaction types and said location service transaction types of said mobile switching center and each of said plurality of mobile terminals, respectively, in parallel using said radio resource sublayer.

9. The telecommunications system of claim 8, further comprising a physical layer, a data link layer and an application layer within said mobile switching center and said given mobile terminal, said radio resource sublayer, said connection managment sublayer and said mobility mangement sublayer residing in said application layer.

10. A method for allowing a telecommunications system to offer location services in parallel to existing services, said method comprising the steps of:

receiving, by a mobile switching center in wireless communication with a plurality of mobile terminals, a location service request for a given one of said plurality of mobile terminals, said mobile switching center and said given mobile terminal having a connection management sublayer therein, said connection management sublayer having a location service transaction type and at least an additional transaction type therein, said mobile switching center and said given mobile terminal also having a mobility management sublayer therein; and establishing, by said mobile switching center, a connection between said location services transaction types of said mobile switching center and said given mobile terminal, respectively, using said mobility management sublayer, in order to perform said location service request.

11. The method of claim 10, wherein said mobile switching center and said given mobile terminal further have a radio resource sublayer therein, said step of establishing said mobility management connection between said location service transaction types of said mobile switching center and said given mobile terminal being performed using said radio resource sublayer.

12. The method of claim 10, wherein said at least one additional transaction type includes at least one of: a call control transaction type, a short message transaction type and a supplementary services transaction type.

13. The method of claim 10, further comprising the step of:

establishing, by said mobile switching center, an additional mobility management connection between said at least one additional transaction types of said mobile switching center and said given mobile terminal, respectively, wherein services represented by said location service transaction type and said at least one additional transaction type are offered in parallel without disrupting each other.

14. The method of claim 10, wherein said at least one additional transaction type is a call control transaction type, and further comprising, before said step of establishing said mobility management connection between said location service transaction types of said mobile switching center and said given mobile terminal, the step of:

establishing, by said mobile switching center, an additional mobility management connection between said call control transaction types of said mobile switching center and said given mobile terminal, respectively, in order to establish a call connection with said given mobile terminal, said step of establishing said mobility management connection between said respective location service transaction types of said mobile switching center and said given mobile terminal being performed without disrupting said call connection.

* * * * *